US010448286B2

(12) United States Patent
Hedberg et al.

(10) Patent No.: US 10,448,286 B2
(45) Date of Patent: Oct. 15, 2019

(54) MOBILITY IN MOBILE COMMUNICATIONS NETWORK

(71) Applicant: TELEFONAKTIEBOLAGET L M ERICSSON (PUBL), Stockholm (SE)

(72) Inventors: Tomas Hedberg, Stockholm (SE); Filip Mestanov, Sollentuna (SE); Karl Norrman, Stockholm (SE); Paul Schliwa-Bertling, Ljungsbro (SE); Jari Vikberg, Järna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 57 days.

(21) Appl. No.: 14/890,749

(22) PCT Filed: May 13, 2013

(86) PCT No.: PCT/SE2013/050529
§ 371 (c)(1),
(2) Date: Nov. 12, 2015

(87) PCT Pub. No.: WO2014/185832
PCT Pub. Date: Nov. 20, 2014

(65) Prior Publication Data
US 2016/0105825 A1    Apr. 14, 2016

(51) Int. Cl.
*H04W 4/00*        (2018.01)
*H04W 36/00*       (2009.01)
(Continued)

(52) U.S. Cl.
CPC ..... *H04W 36/0022* (2013.01); *H04L 63/0407* (2013.01); *H04W 8/26* (2013.01);
(Continued)

(58) Field of Classification Search
CPC . H04W 36/14; H04W 36/0055; H04W 36/08; H04W 84/12; H04W 36/0022;
(Continued)

(56) References Cited

U.S. PATENT DOCUMENTS

2003/0112976 A1*  6/2003  Quick, Jr. ............... H04W 8/06
                                                    380/270
2005/0122941 A1*  6/2005  Wu ..................... H04L 63/0853
                                                    370/338
(Continued)

FOREIGN PATENT DOCUMENTS

DE     102006009726 A1    5/2007
EP         1841267 A2    10/2007
(Continued)

OTHER PUBLICATIONS

Supplementary European Search Report dated Apr. 4, 2016 in corresponding European Application No. 13884545.8, 7 pages.
(Continued)

*Primary Examiner* — Atique Ahmed
(74) *Attorney, Agent, or Firm* — Rothwell, Figg, Ernst & Manbeck, P.C.

(57) ABSTRACT

The present disclosure relates to user equipment (20) mobility between a first radio access network (11) arranged to operate according to a first radio access technology and a second radio access network (12) arranged to operate according to a second radio access technology. A user equipment (20) connected to the first radio access network (11) retrieves information associated with an anonymized temporary identifier assigned to the user equipment (20) by a radio access node (30) in the first radio access network (11), stores the information in the user equipment (20) and
(Continued)

presents the temporary identifier to a radio access point (40) of the second radio access network, when seeking to connect.

29 Claims, 7 Drawing Sheets

(51) Int. Cl.
| | |
|---|---|
| *H04W 76/11* | (2018.01) |
| *H04W 12/06* | (2009.01) |
| *H04W 8/26* | (2009.01) |
| *H04L 29/06* | (2006.01) |
| *H04W 12/00* | (2009.01) |
| *H04W 36/14* | (2009.01) |

(52) U.S. Cl.
CPC ....... *H04W 12/0017* (2019.01); *H04W 12/06* (2013.01); *H04W 76/11* (2018.02); *H04W 36/14* (2013.01)

(58) Field of Classification Search
CPC ....... H04W 8/26; H04W 12/02; H04W 12/06; H04W 76/021; H04L 63/0407
USPC .......................................... 370/331
See application file for complete search history.

(56) References Cited

U.S. PATENT DOCUMENTS

| | | | | |
|---|---|---|---|---|
| 2007/0249352 | A1* | 10/2007 | Song | H04L 63/08 |
| | | | | 455/436 |
| 2007/0293197 | A1* | 12/2007 | Ekberg | H04W 12/02 |
| | | | | 455/414.1 |
| 2008/0233963 | A1* | 9/2008 | Alanara | H04W 12/06 |
| | | | | 455/438 |
| 2009/0109925 | A1* | 4/2009 | Nakamura | H04L 63/062 |
| | | | | 370/331 |
| 2009/0129371 | A1* | 5/2009 | Bishay | H04M 7/123 |
| | | | | 370/352 |
| 2009/0265543 | A1* | 10/2009 | Khetawat | H04L 63/104 |
| | | | | 713/151 |
| 2009/0313466 | A1* | 12/2009 | Naslund | H04L 63/062 |
| | | | | 713/155 |
| 2010/0017601 | A1 | 1/2010 | Falk et al. | |
| 2010/0035577 | A1* | 2/2010 | Rager | H04L 63/1466 |
| | | | | 455/411 |
| 2010/0041405 | A1* | 2/2010 | Gallagher | H04W 8/02 |
| | | | | 455/436 |
| 2010/0189071 | A1* | 7/2010 | Kitazoe | H04W 74/002 |
| | | | | 370/331 |
| 2010/0267363 | A1* | 10/2010 | Blom | H04J 11/0069 |
| | | | | 455/410 |
| 2010/0285812 | A1* | 11/2010 | Murakami | H04W 72/10 |
| | | | | 455/452.1 |
| 2010/0323700 | A1* | 12/2010 | Bachmann | H04W 36/0066 |
| | | | | 455/436 |
| 2011/0039568 | A1* | 2/2011 | Zhang | H04W 52/50 |
| | | | | 455/452.1 |
| 2011/0158162 | A1 | 6/2011 | Mizikovsky et al. | |
| 2012/0040700 | A1* | 2/2012 | Gomes | H04W 4/003 |
| | | | | 455/500 |
| 2012/0165019 | A1* | 6/2012 | Shintani | H04W 36/0022 |
| | | | | 455/436 |
| 2013/0343292 | A1* | 12/2013 | Westerberg | H04W 88/10 |
| | | | | 370/329 |
| 2014/0043982 | A1* | 2/2014 | Bodog | H04W 24/08 |
| | | | | 370/242 |
| 2014/0204927 | A1* | 7/2014 | Horn | H04W 8/26 |
| | | | | 370/338 |
| 2014/0213260 | A1* | 7/2014 | Miyagawa | H04W 36/0033 |
| | | | | 455/436 |

FOREIGN PATENT DOCUMENTS

| | | |
|---|---|---|
| KR | 10 2009 0076755 A | 7/2009 |
| KR | 20090076755 A | 7/2009 |
| WO | 2007102702 A2 | 9/2007 |
| WO | 2008074366 A1 | 6/2008 |
| WO | 2010045985 A1 | 4/2010 |

OTHER PUBLICATIONS

International Search Report in PCT/SE2013/050529 dated Mar. 21, 2014, 5 pages.
Written Opinion in PCT/SE2013/050529 dated Mar. 21, 2014, 7 pages.
European Communication dated Dec. 13, 2017, issued in European Patent Application No. 13 884 545.8, 6 pages.
European Patent Communication dated Jul. 2, 2018 issued in European Patent Application No. 13 884 545.8. (6 pages).

* cited by examiner

MOBILITY IN MOBILE COMMUNICATIONS NETWORK

CROSS REFERENCE TO RELATED APPLICATION(S)

This application is a 35 U.S.C. § 371 National Phase Entry Application from PCT/SE2013/050529, filed May 13, 2013 designating the United States, the disclosure of which is incorporated by reference.

TECHNICAL FIELD

The disclosure relates to methods and network nodes for enabling user equipment handover from a first radio access network arranged to operate according to a first radio access technology, to a second radio access network arranged to operate according to a second radio access technology. In particular, the disclosure relates to methods and network nodes for enabling user equipment handover between a long term evolution, LTE, radio access network and a wireless local area network, WLAN, access network.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a radio access node, commonly referred to as a NodeB, NB, in UMTS, and as an evolved NodeB, eNodeB or eNodeB, in LTE. A radio access node is a general term for a radio network node capable of scheduling transmission to and from user equipment and transmitting radio signals to a UE and receiving signals transmitted from a UE.

In 3GPP systems, user equipment is allowed to attach to and access a wireless communication network if the user equipment is associated with a subscription that allows the wireless communication network to authenticate the user equipment.

Today user equipments, such as mobile phones, typically support other wireless technologies such as Wireless Local Area Networks, commonly referred to as WLAN, in addition to the cellular standards. As a means to improve the network capacity in future networks, WLAN is intended to be an integral part. That is, WLAN will be regarded as just another radio access technology, so that handover can be made to WLAN without the user noticing that the service is no longer being carried by 3GPP technologies like WCDMA or LTE.

Mobile operators are today mainly using WLAN to offload traffic from the mobile networks but the opportunity to improve end user experience regarding performance is also becoming more important. The current WLAN deployments are basically totally separate from mobile networks, and are to be seen as non-integrated. The usage of WLAN is increasing due to the free and wide unlicensed spectrum, and the increased availability of WLAN in mobile terminals like smart phones and tablets. The end users are also becoming more and more at ease with using WLAN for example at offices and homes.

Presently, handover to, or access selection of, the WLAN radio access network is controlled by the user equipment, rather than by the network, due to that the WLAN network is still not sufficiently tightly integrated with the cellular networks using 3GPP technologies. However, using WLAN is often preferred from a user perspective, because of the lower cost associated with it. Therefore, a handover is often performed to WLAN as soon as a WLAN network is detected and the signal strength is sufficiently high. Hence, when user equipment is in range of a WLAN network it will typically connect to this wireless network when the received signal strength indication, RSSI, is sufficiently high, without further analysis.

WLAN integration towards the mobile core network is emerging as a good way to improve the end user experience further. These solutions consist mainly of a common authentication between 3GPP and WLAN, and an integration of WLAN user plane traffic to the mobile core network. The common authentication is based on automatic SIM-based authentication in both access types. The WLAN user plane integration provides the mobile operator the opportunity to provide the same services, like parental control and subscription based payment methods, for the end users when connected both via 3GPP and via WLAN.

WLAN integration into Radio Access Network, RAN, is also emerging as an interesting study object. There are basically two different possible level of integration that could be implemented either separately or together. A first level of integration is to combine both 3GPP and WLAN in the small pico-base stations to gain access to the WLAN sites with 3GPP technology and vice versa. The second level of integration is to integrate the WLAN access tighter into the RAN by introducing enhanced network controlled traffic steering between 3GPP and WLAN based on knowledge about the total situation on the different accesses.

A reason for this second level of integration is to avoid potential issues with UE controlled WLAN selection such as selecting WLAN when the WLAN connection is bad or when the UE is moving, thus giving better end user performance and better utilization of the combined WLAN and cellular radio network resources.

In order to achieve this functionality it is required to link or connect the UE context in the 3GPP RAN, which holds information e.g. about radio performance and UE mobility on the 3GPP side, with the UE context in the WLAN network. This can then enable a network entity to take decisions whether the UE should access the WLAN network or not depending e.g. on if the UE is stationary, and/or has a good connection to the WLAN AP. The decision can then be signaled to the UE or executed internally in the 3GPP/WLAN network, e.g. to control UE admission to WLAN.

SUMMARY

The object of embodiments of the present invention is to address at least some of the issues outlined above, and this object and others are achieved by the method and the arrangement according to the appended independent claims, and by the embodiments according to the dependent claims.

A first aspect of the embodiments relates to a method for user equipment connected to a first radio access network arranged to operate according to a first radio access technology, of enabling handover of the user equipment to a second radio access arranged to operate according to a second radio access technology. The user equipment retrieves, from a radio access node in the first radio access network, information associated with an anonymized temporary identifier assigned to the user equipment by a radio access node, the temporary identifier representing the user equipment in the first radio access network. The information associated with the temporary identifier is stored in the user equipment. When seeking to connect to the second radio access network, the user equipment presents the temporary identifier to a radio access point of the second radio access network.

The user equipment may further retrieve information associated with the radio access node, and includesaid information in the presenting of the temporary identifier to the radio access point. Said information may comprise a first radio access network context, which corresponds to an identifier of the radio access node, and/or a location of the radio access node in the first radio access network.

A second aspect ofthe embodiments relates to user equipment connectable to a first radio access network arranged to operate according to a first radio access technology and to a second radio access network arranged to operate according to a second radio access technology for enabling handover from the first radio access network to the second radio access network. The user equipment comprises a temporary identifier handling entity arranged to retrieve, from a radio access node in the first access network, information associated with an anonymized temporary identifier assigned to the user equipment by the radio access node, the temporary identifier representing the user equipment in the first radio access network. The temporary identifier handling entity is further arranged to store the information associated with the temporary identifier. The temporary identity handling entity presents the temporary identifier to a radio access point of the second radio access network when seeking to connect to the second radio access network.

A third aspect of the embodiments relates to a computer program comprising computer program code that causes the user equipment to execute said method when run in said user equipment.

Other aspects of user equipment embodiments are consistent with the presentation in the detailed description and the claims.

A fourth aspect of the embodiments relates to a method for a radio access node of a first radio access network arranged to operate according to a first radio access technology of enabling handover of connected user equipment from the first radio access network to a second radio access network arranged to operate according to a second radio access technology. The radio access node assigns an anonymized temporary identifier to the user equipment when the user equipment is connected to the first radio access network, the temporary identifier representing the user equipment in the first radio access network. Information associated with the temporary identifier is transmitted to the connected user equipment from the radio access node.

Further, information associated with the temporary identifier may be transmitted to a user equipment location entity.

A fifth aspect of the embodiments relates to a radio access node arranged to operate according to a first radio access technology, wherein the radio access node is adapted for enabling handover of connected user equipment from the first radio access network to a second radio access network arranged to operate according to a second radio access technology. The radio access node comprises a temporary identifier assignment entity arranged to assign an anonymized temporary identifier to a user equipment connected to the first radio access network. The radio access node also comprises a signaling entity arranged to transmit information associated with the temporary identifier to the user equipment.

The transmitted information may further comprise a first radio access network context, and the information may also be transmitted to a user equipment location entity.

A sixth aspect of embodiments relates to a computer program comprising computer program code that causes the radio access node to execute said method when run in said radio access node.

Other aspects of radio access node embodiments are consistent with the presentation in the detailed description and the claims.

A seventh aspect of the embodiments relates to a method for a radio access point of a second radio access network arranged to operate according to a second radio access technology of enabling handoverof user equipment from a first radio access network arranged to operate according to a first radio access technology to the second radio access network. The radio access point receives an anonymized temporary identifier from user equipment seeking to connect to the second radio access network, and retrieves information associating the user equipment temporary identifier with a first radio access network context.

The retrieval of information associating the user equipment temporary identifier with a first radio access network may involve sending a query comprising the temporary identifier to a user equipment location entity, and the radio access point may receive the information associating the user equipment temporary identifier with a first radio access network context in a response from the user equipment location entity.

An eight aspect of the embodiments relates to a radio access point arranged to operate according to a second radio access technology, and adapted for enabling handover of user equipment from a first radio access network arranged to operate according to a first radio access technology to the second radio access network. The radio access point comprises a temporary identifier receiver arranged to receive a temporary identifier from a user equipment seeking to connect to the second radio access network. The radio access point also comprises a network context retrieval entity arranged to retrieve information associating the temporary identifier with a first radio access network context.

A ninth aspect of embodiments relates to a computer program comprising computer program code that causes the radio access point to execute said method when run in said radio access point.

Other aspects of radio access point embodiments are consistent with the presentation in the detailed description and the claims.

A tenth aspect of the embodiments relates to a method for a user equipment location entity of enabling handover of user equipment in a mobile communication network. The mobile communication network comprises at least one user equipment connectable to a first radio access network arranged to operate according to a first radio access technology and to a second radio access network arranged to operate according to a second radio access technology. The user equipment location entity receives information associated with an anonymized temporary identifier assigned to user equipment from a radio access node of the first radio access network. A first radio access network context for the temporary identifier is generated by associating the information associated with the temporary identifier with a radio access node identifier. The user equipment location entity stores the first radio access network context for the temporary identifier. When receiving a query comprising the temporary identifier from a radio access point of the second radio access network, the user equipment location entity retrieves the first radio access network context and sends the first radio access network context to the radio access point.

A eleventh aspect of the embodiments relates to user equipment location entity in a mobile communication network adapted to enable handover of at least one user equipment connected to a first radio access network arranged to operate according to a first radio access technology to a second radio access network arranged to operate according to a second radio access technology. The user equipment location entity comprises a temporary identifier location associater arranged to receive information associated with an anonymized temporary identifier assigned to user equipment from a radio access node of the first radio access network, and to generate a first radio access network context for the temporary identifier. The user equipment location entity further includes a memory storing the temporary identifier and the first radio access network context. A user equipment location provider of the user equipment location entity is arranged to retrieve the first radio access network context for the temporary identifier upon receipt of a query from a radio access point of the second radio access network and to send the first radio access network context to the radio access point.

A further aspect of such a user equipment location entity embodiment relates to a computer program comprising computer program code that causes the user equipment location entity to execute said method when run in said user equipment location entity.

Other aspects of user equipment location entity embodiments are consistent with the presentation in the detailed description and the claims.

It is an advantage with disclosed embodiments that they enhance user equipment mobility between a first radio access network arranged to operate according to a first radio access technology and a second radio access network arranged to operate according to a second radio access technology, without compromising the integrity of a user equipment moving between these networks. In particular, at least some embodiments enable access to radio-related data from the first radio access network in the second radio access network, thereby enabling network controlled mobility decisions.

A further advantage is to provide an improved service to user equipment, and an improved load balancing in the network, while preserving user privacy.

BRIEF DESCRIPTION OF THE DRAWINGS

The present technique will be more readily understood through the study of the following detailed description of the embodiments/aspects together with the accompanying drawings, of which:

FIG. 2
a. schematically illustrates a flow chart of a method in a user equipment
b. schematically illustrates a block diagram of a user equipment.

FIG. 3
a. schematically illustrates a flow chart of a method in a radio access node
b. schematically illustrates a block diagram of a radio access node.

FIG. 4
a. schematically illustrates a flow chart of a method in a radio access point
b. schematically illustrates a block diagram of a radio access point.

FIG. 5
a. schematically illustrates a flow chart of a method in a user equipment location entity
b. schematically illustrates a block diagram of a user equipment location entity.

DETAILED DESCRIPTION

The various steps described below in connection with the figures should be primarily understood in a logical sense, while each step may involve the communication of one or more specific messages depending on the implementation and protocols used.

Mechanisms have been introduced for allowing the UE to perform authentication towards the WLAN network using (U)SIM credentials and identities, International Mobile Subscriber Identity IMSI, as part of the EAP-SIM/AKA/AKA' protocol signaling. This means that there is a common identity, the IMSI, available on both the 3GPP and WLAN sides. The main principle for solutions based on IMSI would be that the current serving 3GPP radio access node updates a UE database with the association IMSI and serving 3GPP RAN node. When the legacy UE attempts to access the WLAN side, the WLAN network contacts the UE database to retrieve information about current RAN node for the UE and IMSI is used as the main key in this query. Once the WLAN side retrieves information about the RAN node, communication between the radio accesses is enabled and information on both sides can be combined to make the optimal mobility decision, which can be taken either at the non-3GPP access side, at the current 3GPP RAN node serving the UE, or at a more central function that also collects the information needed for the mobility decision.

However, a conventional system that collect and store users' location, or other privacy sensitive data, in a central location, may be misused. Even if the intention with the system is not to invade users' privacy, it may be tempting to re-use the data for different purposes once it is collected. Therefore, central collection of privacy sensitive data should be avoided, in particular when designing new functions. In the LTE, the IMSI is not known at the radio access nodes, eNodeBs in the E-UTRAN. Thus, solutions for retrieving user equipment information based on IMSI, are not feasible for LTE. Consequently, there is a need for improving user equipment mobility between a first radio access network and a second radio access network, and to provide solution that preserves the privacy of a user equipment location.

Embodiments of the present disclosure relate, in general, to the field of LTE and WLAN. However, it must be understood that the same principles are applicable in any communication system where user equipment connected to a first radio access network seeks to connect to a second radio access network.

Figure 1:
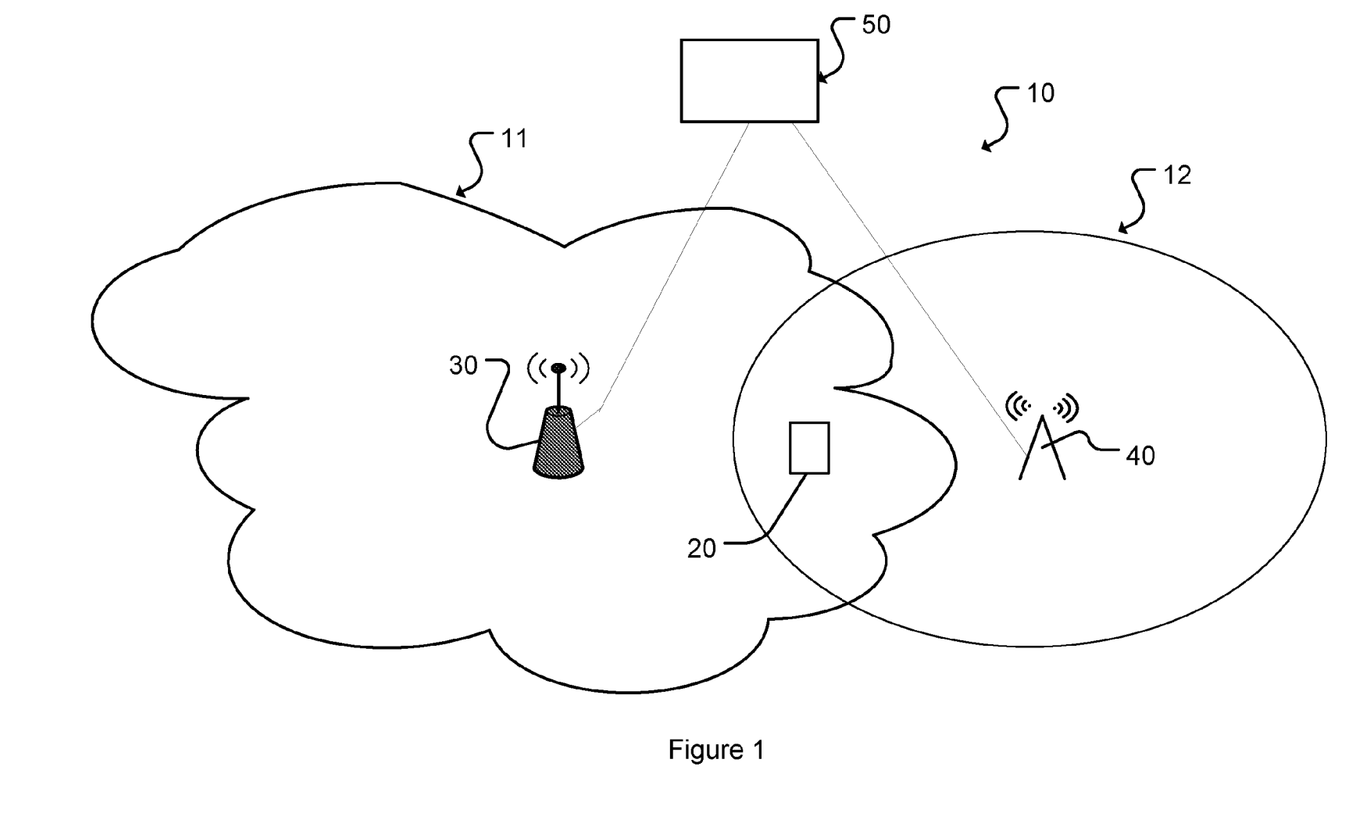
FIG. 1 schematically illustrates a mobile communication network including WLAN cells.

FIG. 1 schematically illustrates a mobile communication network 10. The network 10 comprises user equipment 20, a first radio access network 11, preferably configured as a 3GPP radio access network, 3GPP RAN, and a second radio access network 12, preferably configured as a wireless local area network, WLAN. In the illustrated example, user equipment 20 is connected to the cellular network 11 via a radio access node 30. The user equipment 20 is also within the range of the wireless local area network 12, having a radio access point 40. In order to achieve good support for network-controlled WLAN/3GPP access selection or handover, it is required to link or connect the user equipment context in the 3GPP RAN, which holds information about radio performance, device mobility etc. on the 3GPP side, with the device context in the WLAN. A user equipment location entity 50 is communicatively connected to the radio access node 30 and the radio access point 40. The user equipment location entity is, as will be explained in the following, configured to contribute to providing said link between the user equipment context in the first radio access network 11 and the user equipment context in the second radio access network 12.

Figure 6:
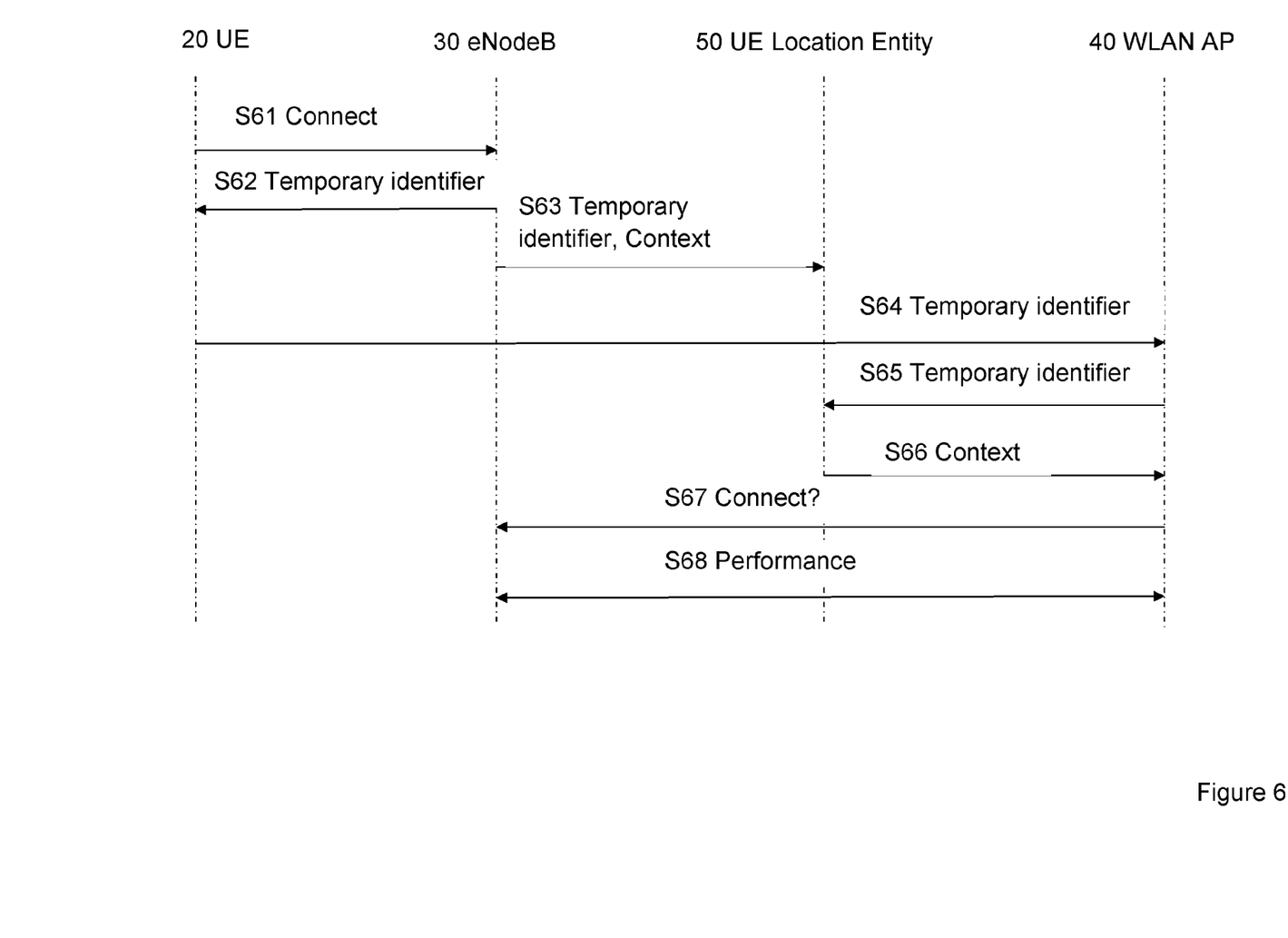
FIG. 6 is a message sequence chart illustrating messaging between a user equipment, a radio access node, a radio access point and a user equipment location entity

FIG. 6 is a message sequence chart illustrating a first alternative messaging between user equipment 20, a radio access node 30, a radio access point 40 and a user equipment location entity 50. The UE 20 sends a connection message S61 to an access node, e.g. an eNodeB, of a first radio access network 11, i.e. a 3GPP network. The eNodeB responds with a temporary identifier message S62 including an anonymized temporary identifier. The UE 20 stores the temporary identifier. The eNodeB registers the temporary identifier and a context, e.g an eNodeB ID or an eNodeB location, by means of a registration message S63 directed to a user equipment location entity 50. While connected to the eNodeB, the UE may discover an access point of a second radio access network, e.g. an access point of a WLAN. The UE then attempts to associate to the WLAN and sends a temporary identifier message S64 to the WLAN AP as part of an authentication procedure. The WLAN AP receives the temporary identifier message S64 and specifically takes notice of the temporary identifier. The WLAN AP extracts the temporary identifier and sends a request for information to the UE location entity in message S65. The UE location entity responds with a message S66 identifying the UE context in the first radio access network 11, e.g. by including an identifier of a controlling eNodeB or the location of this eNodeB. Following receipt of the first radio access network context, the WLAN AP is capable of connecting to the eNodeB by a connection message S67, and to exchange information on radio performance in message S68. Following exchange of information on radio performance, the WLAN AP takes a decision on handover of the UE to the WLAN.

Figure 7:
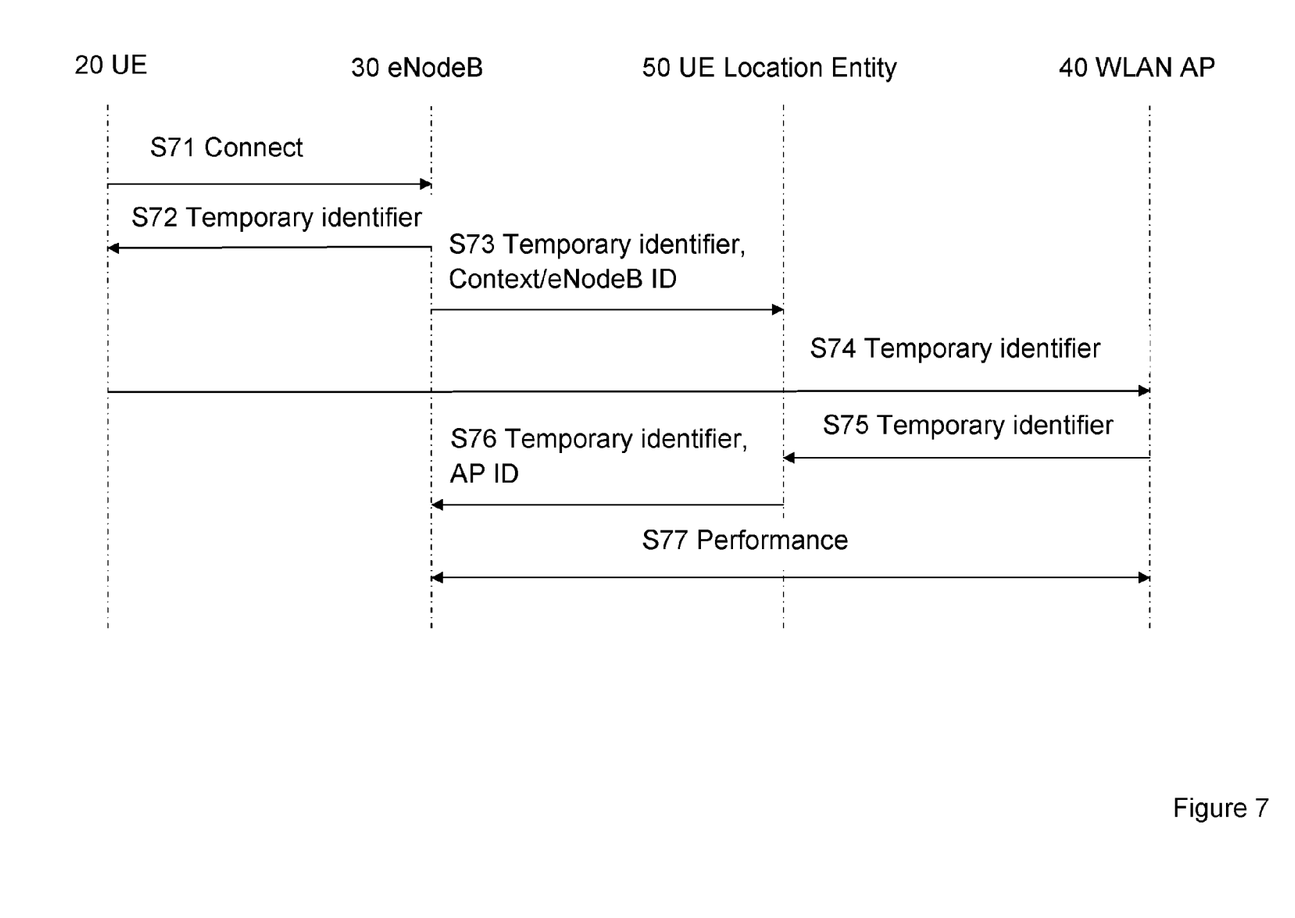
FIG. 7 is a message sequence chart illustrating an alternative messaging between a user equipment, a radio access node, a radio access point and a user equipment location entity It should be added that the following description of the embodiments is for illustration purposes only and should not be interpreted as limiting the disclosure exclusively to these embodiments/aspects.

FIG. 7 is a message sequence chart illustrating a second alternative messaging between user equipment 20, a radio access node 30 of a first radio access network 11, a radio access point 40 of a second radio access network 12 and a user equipment location entity 50. As in the embodiment disclosed in FIG. 6, the UE 20 sends a connection message S71 to the first radio access node 30, e.g. an eNodeB, of the first radio access network 11, i.e. a 3GPP network. The eNodeB responds with a temporary identifier message S72 including an anonymized temporary identifier. The UE 20 stores the temporary identifier. The eNodeB registers the temporary identifier and a context, e.g an eNodeB ID or an eNodeB location, by means of a registration message S73 directed to a user equipment location entity 50. While connected to the eNodeB, the UE may discover a radio access point 40 of a second radio access network 11, e.g. a WLAN access point. The UE then attempts to associate to the WLAN and sends a temporary identifier message S74 to the WLAN AP as part of an authentication procedure. The WLAN AP receives the temporary identifier message S74 and notices the temporary identifier. The WLAN AP extracts the temporary identifier and sends a request for information to the UE location entity in message S75. The UE location entity retrieves the first radio access network context based on the temporary identifier in message S75, and transmits a message including the temporary identifier and an identification of the WLAN access point in a message S76. The eNodeB is then capable of connecting to the WLAN AP 40 and to exchange information on radio performance in message S77. Following exchange of the information on radio performance, the eNodeB takes a decision on handover to the WLAN. The mobility decision can be taken either at the non-3GPP access side, at the current 3GPP RAN node serving the UE, or at a more central function that also collects the information needed for the mobility decision.

Figure 2A:
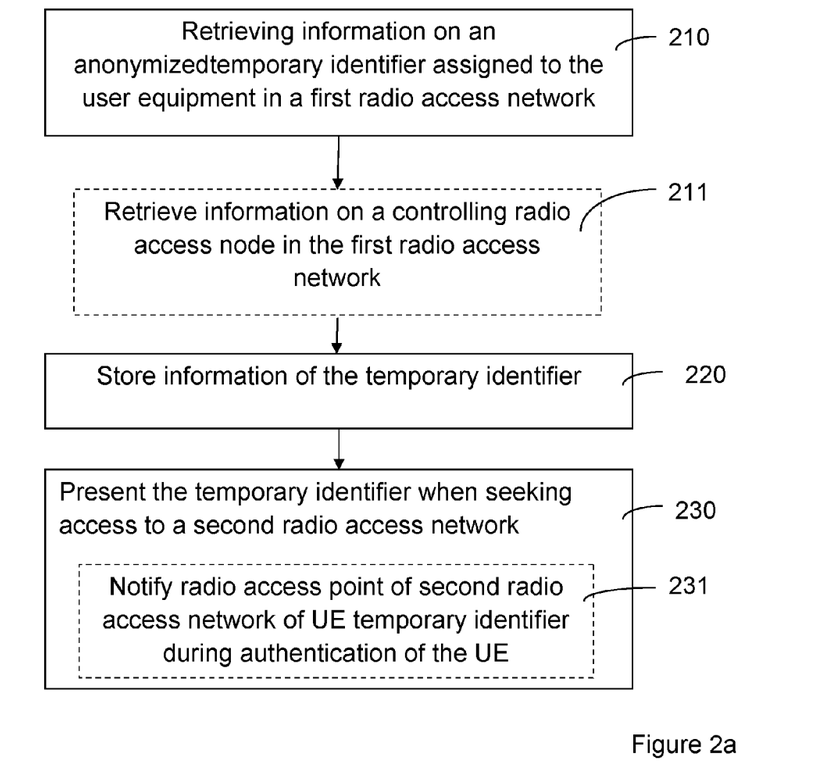

FIG. 2a is a flowchart disclosing an exemplary method in user equipment 20. When the UE 20 first connects to an access node 30 of a first radio access network 11, e.g. an eNodeB in LTE, it retrieves from a radio access node 30 in the first radio access network 11, in step 210, information associated with an anonymized temporary identifier assigned to the user equipment 20 by the radio access node, the temporary identifier representing the user equipment in the first radio access network 11. Connection to the eNodeB 30 is performed via attach, an intra-LTE handover from another eNodeB or via inter-radio access technology, inter-RAT, handover from GSM, UMTS or a non-3GPP access or any other way of connecting to a radio access network.

According to embodiments of the disclosure, the retrieved information is the temporary identifier assigned to the user equipment 20 by the radio access node 30 of the first radio access network 11, i.e. the information associated with temporary identifier is a match to the temporary identifier assigned to the user equipment 20 by the eNodeB of the first radio access network 11. However, in an alternative solution the retrieved information is data coordinated with the radio access node 30 during the assigning of the anonymized temporary identifier. Said data is used in the user equipment to generate a replica of the temporary identifier based on the retrieved information. If the eNodeB generates the anonymized temporary identifier from data both it and the UE know, it is not necessary to transfer the temporary identifier from the eNodeB to the UE. The reason is that the UE can generate the same temporary identifier locally. It is crucial that the eNodeB and UE has coordinated the data before doing this. An example of this type of generation is if the eNodeB and the UE generate the temporary identifier by deriving it from the KeNB, Key eNodeB, using a key derivation function. The KeNB is the key the UE and eNodeB use to protect the traffic they transmit to each other. The UE and eNodeB both have to know exactly what it is. Using this approach, the generated temporary identifier will be statistically unique for all UEs and it will, for all practical purposes, be impossible to deduce a correlation between a specific user equipment identity and the temporary identifier, i.e. the temporary identifier is truly anonymized.

In an optional step 211, the user equipment 20 further retrieves information associated with the radio access node 30 and includes said information in the presenting 230 of the temporary identity to a radio access point of the second radio access network 12 when seeking to connect to the second radio access network 12. The retrieved information identifies the radio access node, e.g. by an unique eNodeB identity, or identifies the location of the radio access node, which may be referred to as a first radio access network context in this disclosure.

In step 220, the information associated with the temporary identifier is stored in the user equipment 20. While connected to the eNodeB, the UE may discover an access point 40 of a second radio access network 12 , e.g. a wireless local area network access point, WLAN AP. The UE 20 can then attempt to associate with the WLAN AP 40. During the authentication part of the association process, the UE 20 provides the WLAN AP 40 with its Network Access Identifier, NAI. The NAI typically has the format user@example.com. In a further step 230 in the UE 20, the UE presents the temporary identifier when seeking to connect to the WLAN AP.

A further embodiment comprises presenting the temporary identifier to the WLAN AP during a notification 231 of the temporary identifier during an authentication of the user equipment in the second radio access network 12. Thus, the user equipment 20 provides the presentation of temporary identifier in authentication data to the radio access point 40 as disclosed in step 231. In an embodiment of the disclosure, the UE decorates the NAI with the earlier received temporary identifier. The UE 20 may for example decorate the NAI by appending a special character followed by the base64 encoding of the temporary identifier, like this: user@example.com\c3VyZS4=.

Figure 2B:
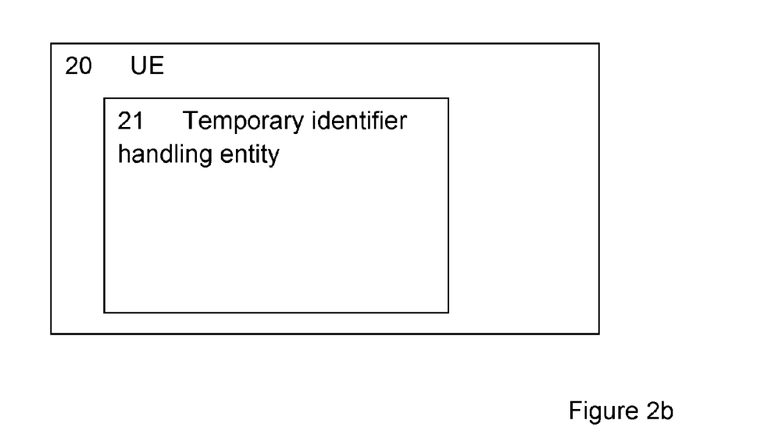

FIG. 2b illustrates a schematic block diagram of user equipment 20 wherein the disclosed method is implemented. In addition to state of the art equipment part of that is part of conventional user equipment, e.g. processor, transceiver and memory circuits, the user equipment 20 includes a temporary identifier handling entity 21. This entity is preferably realized as a logical entity, but could of course also be implemented as a physical entity. The temporary identifier handling entity 21 is arranged to store information associated with a temporary identifier retrieved when the user equipment 20 connects to the radio access node 30, e.g. an eNodeB, and to include the user equipment temporary identifier in a connection request to a radio access point 40, e.g. an WLAN AP.The temporary identifier handling entity 21 is arranged to retrieve, from a radio access node 30 in the first radio access network 11, information associated with an anonymized temporary identifier assigned to the user equipment by the radio access node 30. The information associated with the temporary identifier is arranged to be stored in the temporary identity handling entity and to be presented to the radio access point 40 of a second radio access network 12, when seeking to connect to the second radio access network. The retrieved information associated with the anonymized temporary identifier assigned to the user equipment is, according to an aspect of the disclosure, the temporary identifier itself. In an alternative solution, the temporary identifier handling entity 21 is arranged to determine a replica of the user equipment temporary identifier from data stored in the user temporary identifier handling entity 21 and coordinated with the eNodeB. In accordance with an embodiment of the disclosure, the logical entity is a computer program product downloaded to the user equipment 20 and run as an application in the user equipment 20. The application listens to a specific UDP/TCP port number having received the temporary identifier from the eNodeB.

The application in the UE is preferably pre-installed and configured to understand the format in which the eNodeB sends the temporary identifier. The application could be installed at manufacturing time or could be downloaded from the internet or, e.g., from an app-store.

Figure 3A:
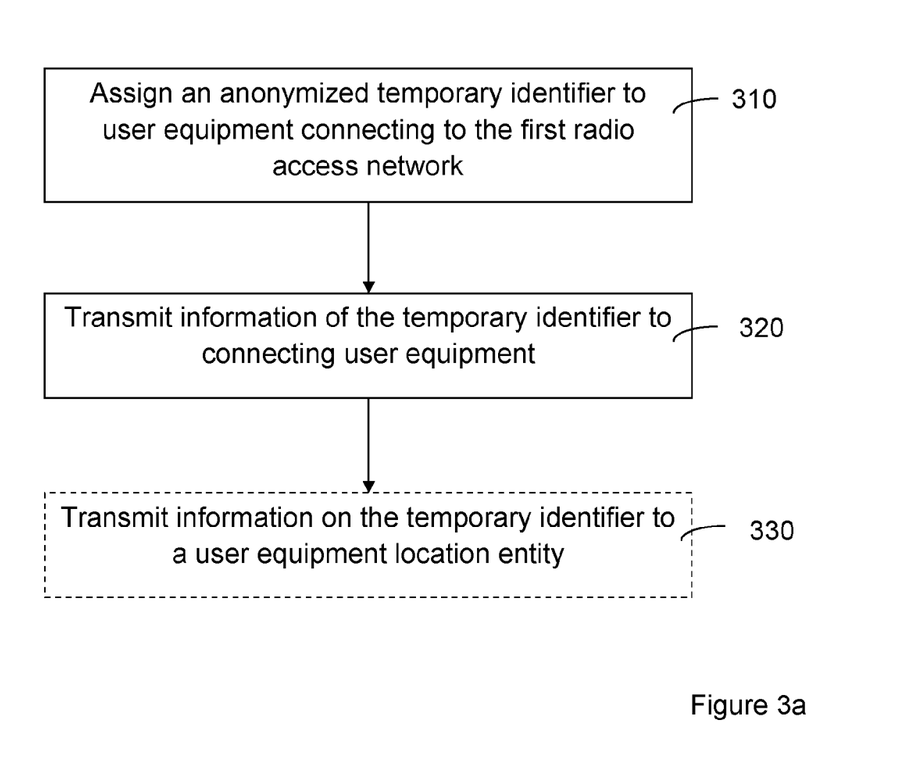

FIG. 3a discloses a flow chart of an exemplary method in a radio access node 30. When the radio access node belongs to a first radio access network that is a long term evolution, LTE, radio access network, the radio access node 30 is an eNodeB of the LTE radio access network. A UE 20 is connected to a radio access node 30 of a first radio access network, e.g. a 3GPP accessnetwork, i.e. to a radio base station of GSM, to a nodeB of UMTS or to an eNodeBof LTE radio access network. The network assigns, in step 310, a temporary identifier to the UE and sends, in step 320, information associated with the temporary identifier to the UE, e.g., the temporary identifier itself assigned to the user equipment or data making it possible to deduce the temporary identifier in the receiving user equipment 20 and to generate a replica of the temporary identifier in the user equipment 20 from this data. The temporary identifier can be for example a pseudo/randomly generated number. The temporary identifier must be sufficiently long to ensure that it is a self-sufficient identifier of the user equipment 20 in the first radio access network 11 and at least statistically unique within the system. If it is not, there is a risk that the system will incorrectly deduce that a certain UE 20 is connected to an eNodeB, when in reality it is not. Since the temporary identifier is pseudo/randomly generated, it is impossible to deduce which UE it is associated with.

The temporary identifier can be (pseudo) randomly generated. There are also other ways to generate the temporary identifier, and still ensure that it is statistically unique and difficult to connect to a particular UE. One option is to form the temporary identifier by concatenating the C-RNTI currently used by the UE and a timestamp. Other options include hashing the C-RNTI, the physical cell identity, the eNodeB ID and a timestamp.

It is possible that the eNodeB does not generate a new temporary identifier when it is needed, but rather keeps a pool of pre-generated temporary identities and draws a temporary identifier from the pool when required. Another possibility is that a separate entity generates the temporary identities and sends these to the eNodeB. In an optional step 330, the eNodeB registers the temporary identifier with a user equipment location entity by transmitting information associated with the temporary identifier to the user equipment location entity 50. The UE location entity 50 stores the received temporary identifier. Together with the temporary identifier, the UE location entity 50 also stores information that identifies the eNodeB or the eNodeBs location, and this information may be referred to as a first radio access network context.

Note that the UE location entity does not know which UE or which subscriber corresponds to the temporary identifier. It is hence impossible to use the information in the UE location entity to track the whereabouts of subscribers. An alternative to registering the temporary identifier with the user equipment location entity 50, is to include information associated with the radio access node identity or radio access node location with the temporary identifier transmitted to the connecting user equipment 20.

To avoid impact on radio protocols in the baseband, the eNodeB can transmit, step 320, the temporary identifier or information associated with the temporary identifier to the UE on the application layer. Other options include introducing a proprietary or standardized RRC procedure to transmit the temporary identifier to the UE, and to piggyback the temporary identifier on an existing RRC message. Modifying the RRC protocol requires changes to the baseband implementations in the UEs and eNodeBs. This implies that it will be difficult to introduce the invention in legacy UEs. Downloading and installing a TCP/IP based application is, on the other hand, possible on many, perhaps even most, UEs today.

Figure 3B:
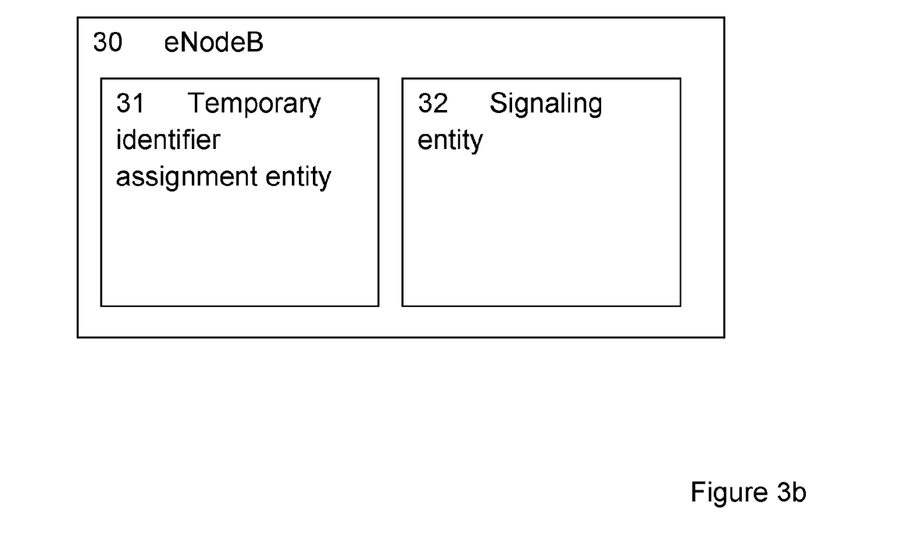

FIG. 3b illustrates a schematic block diagram of a radio access node 30 for enabling handover of connected user equipment 20 from a first radio access network 11. According to an aspect of the disclosure, the first radio access network 11 is a long term evolution, LTE, radio access network and the radio access node 30 is an eNodeB of the LTE radio access network. Handover may be performed from the eNodeB in the LTE radio access network, to a second radio access network, e.g a WLAN. In addition to state of the art equipment part of a conventional eNodeB, e.g. processor, radio transceivers, memory and communication circuits, the eNodeB includes a temporary identifier assignment entity 31 and a signaling entity. These entities are preferably realized as logical entities, but could of course also be implemented as physical entities of a physically reconfigured radio access node 30.

Figure 4A:
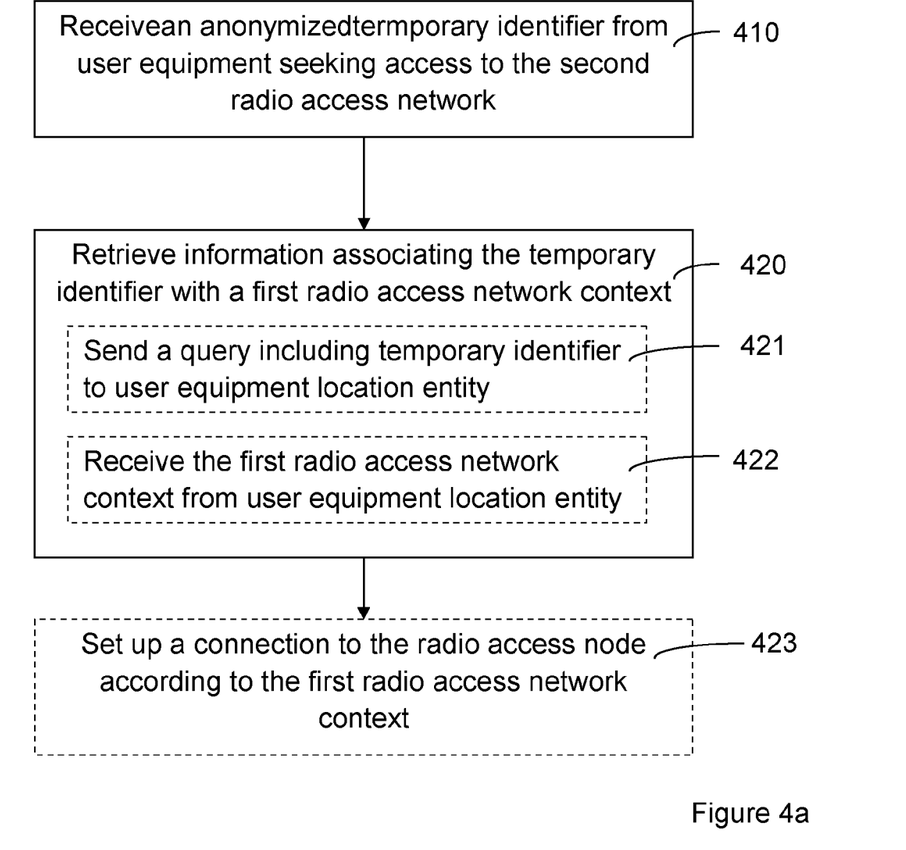

FIG. 4a discloses a flow chart of an exemplary method in a radio access point 40 of a second radio access network 12, which according to an aspect of the disclosure is a wireless local area network, WLAN, access network, i.e. a method performed in an access point of a WLAN. While connected to the eNodeB, the UE 20 may discover the WLAN access point, AP 40. The UE can then attempt to associate with the WLAN AP. The access point of the second radio access network, e.g. the WLAN radio access network receives, step 410, a temporary identifier from a user equipment 20. The access point 40, WLAN AP, then proceeds in step 420 to retrieve information associating the temporary identifier with a first radio access network context. In the case where information on the first radio access network context is included in the authentication information provided by the user equipment 20 as part of the association process, the WLAN AP40 identifies the first radio access network context in the received information and optionally proceeds to the step 423 of setting up a connection to the radio access node 30 of the first radio access network context. The WLAN AP may then retrieve information about the radio conditions for the UE in the first radio access network 11. Alternatively, the WLAN AP provides the eNodeB with information about the radio conditions for the WLAN connection. The latter may help the eNodeB to decide if it is beneficial to hand the terminal over to WLAN.

When the WLAN AP receives the temporary identifier in step 410, e.g as part of an authentication message such as a network access identifier, NAI, the WLAN AP extracts the temporary identifier. The WLAN AP then proceeds to the step of retrieving information associating the temporary identifier with a first radio access network context in step 420. In an optional step 421, the WLAN AP sends a query including the temporary identifier to a user equipment location entity 50, and receives a first radio access network context in return, in step 422. Upon receipt of the query, the UE location entity retrieves the information that identifies the eNodeB or the eNodeBs location that is associated with the temporary identifier, i.e. the first radio access network context. The UE location entity returns this information to the WLAN AP. At this point, the WLAN access network can proceed to the step 423 of setting up a connection to the eNodeB to communicate with the 3GPP base station in order to determine based on the available information whether it is beneficial to hand the UE over to WLAN instead of keeping it in 3GPP access. Using the received information about the eNodeB where the UE is currently connected to, the UE related information available in the so located serving eNodeB (3GPP radio access network node) and in the WLAN AP can be associated and processed to determine whether to proceed associating with the UE or whether the UE is better off staying connected to the eNodeB. In the latter case, the WLAN AP may gracefully reject the association attempt from the UE.

Figure 4B:
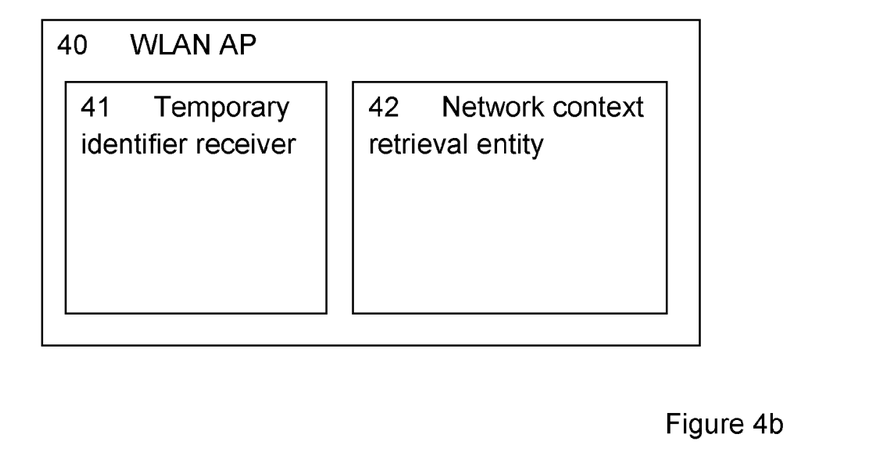

FIG. 4b illustrates a schematic block diagram of a radio access point 40 of a second radio access network. According to an aspect of the disclosure, the second radio access network is a wireless local area network, WLAN, access network wherein the disclosed method is implemented. In addition to state of the art equipment part of a conventional WLAN AP, e.g. processor, transceivers, and memory circuits, the WLAN AP includes a temporary identifier receiver 41, and a network context retrieval entity 42. These entities are preferably realized as logical entities, but could of course also be implemented as physical entities of a physically reconfigured WLAN AP40. The temporary identifier receiver 41 is arranged to receive a user equipment temporary identifier from a user equipment 20 seeking to connect to the WLAN 12. The network context retrieval entity 42 is arranged to retrieve information associating the user equipment temporary identifier with the 3GPP context.

Figure 5A:
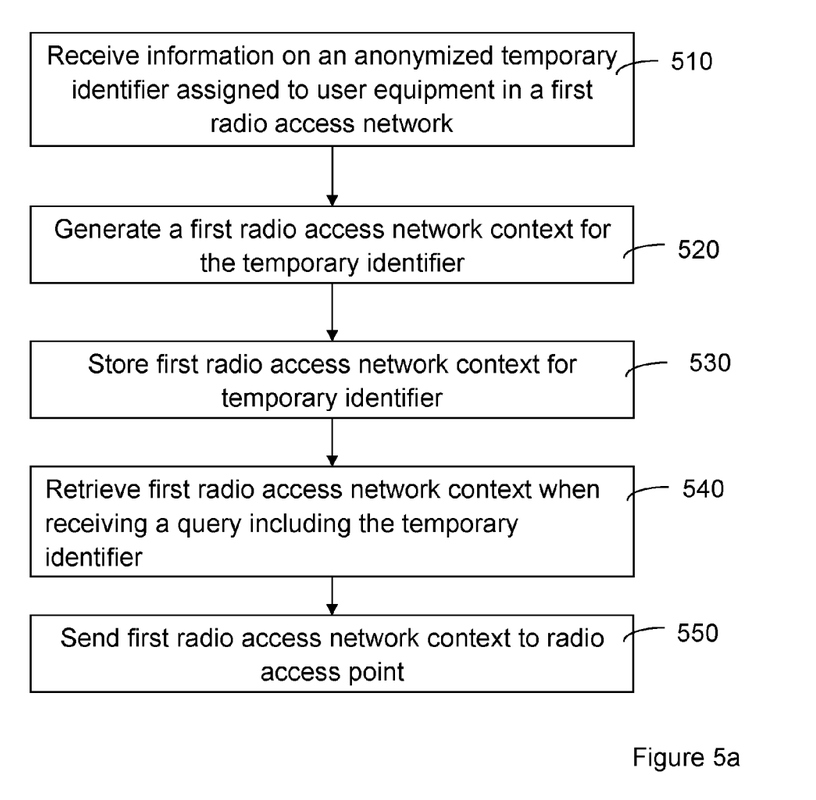

FIG. 5a discloses a flow chart of an exemplary method in a user equipment location entity 50. The UE location entity keeps track of the eNodeB or other anchor point that assigned the temporary identifier. The eNodeB registers the temporary identifier with the UE location entity that receives the information from the eNodeB. Upon receipt, in step 510, of information associated with the temporary identifier, the user equipment location entity also generates, in step 520, a first radio access network context for the temporary identifier, e.g. by associating the temporary identifier with an address of the eNode B or a location of the eNodeB. In step 530, the UE location entity stores the received temporary identifier and the associated radio access network context, i.e., together with the temporary identifier, the UE location entity also stores information that identifies the eNodeB or the eNodeBs location. Note that the UE location entity does not know which UE or which subscriber corresponds to the temporary identifier. It is hence impossible to use the information in the UE location entity storage to track the whereabouts of subscribers. The UE location entity retrieves the first radio access network context in step 540, when receiving a query including the temporary identifier, i.e. the user equipment location entity 50 looks up the base station identifier associated with the temporary identifier and, in step 550, sends that or some related information back to the WLAN access point having initiated the query.

The information related to the eNodeB that the UE location entitystores, may be of different types. One option is that the UE location entity has a database containing the locations of the closest WLAN APs for each eNodeB and a list of priorities assigned to each WLAN AP.

In the first embodiment the decision whether to hand the UE over to WLAN was taken by the WLAN AP (or by the WLAN AC). That is not necessarily the only option as described earlier in the current document. The mobility decision can be taken either at the non-3GPP access side, at the current 3GPP RAN node serving the UE, or at a more central function that also collects the information needed for the mobility decision.

For example, it is possible to envision a separate function, a WLAN Handover Decision Point function, WLAN HO DP that may be more centrally placed. The WLAN HO DP may be implemented in a separate server that is consulted by the WLAN APs when they encounter a temporary identifier. A benefit of this centralized approach is that, to decide whether it is beneficial to hand the UE over to WLAN may comprise advanced policy decisions that use more than only the location of the eNodeB as basis. Further, information about the physical location of eNodeBs and APs may be better to keep in a central and better protected location than in WLAN APs. A possible drawback with this type of solution is that a lot of radio related and UE-specific information would need to be collected in this central location. The WLAN APs could access the central WLAN HO DP and request a policy decision regarding the handover or access selection. The answer could be "accept", "deny" or "decide for yourself". The latter answer may represent that the WLAN HO DP does not have any information about the temporary identifier the WLAN AP provided.

Using a central WLAN HO DP also provides another layer of security. Using the simple protocol strategy outlined in the previous paragraph, the WLAN APs cannot deduce the physical location of a particular temporary identifier.

If a WLAN HO DP function requests for information associated with a certain temporary identifier, the WLAN HO DP may then receive the prioritized list of WLAN APs back. The WLAN HO DP function then decides if the priority for the given WLAN AP is high enough to warrant a handover to WLAN. This is just one example and the number of policy options is virtually endless.

The information related to the eNodeB that the UE location entity stores, may be of different types. One option is that the UE location entity has a database containing the locations of the closest WLAN APs for each eNodeB and a list of priorities assigned to each WLAN AP. When the WLAN HO DP function requests for information associated with a certain temporary identifier, the WLAN HO DP may then receive the prioritized list of WLAN APs back. The WLAN HO DP function then decides if the priority for the given WLAN AP is high enough to warrant a handover to WLAN. This is just one example and the number of policy options is virtually endless.

Further, in the 3GPP access involved is not LTE, but rather GSM or UMTS, the information would be related to whichever node is selected for that access. It could for instance be the SGSN. Note however, that even if it is the RNC that generates and transmits the temporary identifier to the UE, the information related to the RNC stored in the UE location entity may contain which NodeB the temporary identifier is connected to.

A simple, but perhaps most useful, piece of information that can be contained in the information related to the eNodeB location, is an addressor indication of which eNodeB the terminal is connected to currently. According to an aspect of the disclosure, the first radio access network context is an IP address of the radio access node 30 in the first radio access network 11. The WLAN HO DP locates said eNodeB and retrieves information about the radio conditions for the UE. Alternatively, the WLAN HO DP provides the eNodeB with information about the radio conditions for the WLAN connection. The latter may help the eNodeB to decide if it is beneficial to hand the terminal over to WLAN.

Figure 5B:
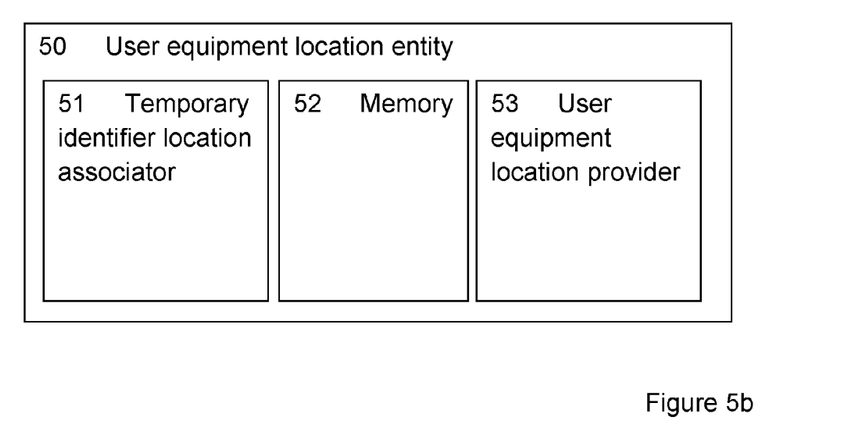

FIG. 5b discloses a schematic block diagram of a user equipment location entity 50 wherein the disclosed method is implemented. The UE location entity could be implemented in a core network node or any other type of existing node accessible and known to the radio access node 30 of the first radio access network 11 and the radio access point 40 of the second radio access network. The UE location entity is preferably realized as a logical entity in the existing node, but could also be implemented as a physical entity. The UE location entity 50 includes a temporary identifier location associater 51 arranged to receive information associated with a temporary identifier assigned to a user equipment 20 from a radio access node 30 of a first radio access network 11, and to generate a first radio access network context for the temporary identifier. The UE location entity 50 further includes a memory 52, e.g a database, arranged to store the first radio access network context for the temporary identifier. A user equipment location provider 53 in the UE location entity 50 is arranged to retrieve the first radio access network context for the temporary identifier upon receipt of a query from a radio access point 40 of the second radio access network and to send the first radio access network context to the radio access point 40.

The above detailed description has addressed embodiments in a LTE/WLAN network. However, the disclosure is also applicable to user equipment 20 connected to a GSM or UMTS network. In some embodiments of the invention, the UE may be connected to a GSM or UMTS network. In the former case, the BTS, BSC or SGSN may generate the temporary identifier. The choice of function in which to place the temporary identifier generation and how the temporary identifier is transferred to the UE depends on how much protocol impact is acceptable.

If the radio resource protocol carries the temporary identifier from the BSC to the UE, or if other lower layer protocols carries the temporary identifier from the BTS to the UE, then there will be an impact on the baseband in the UE. This has the same drawbacks as the previous section discussed for LTE. Therefore, it may be better to use a UDP/TCP packet to transfer the temporary identifier also in GSM. That implies that the temporary identifier generation function may be best placed in the SGSN and transfer it to the UE from there. Since packet switched GSM uses ciphering between the SGSN and the terminal, the BSC cannot inject IP packets towards the UE. In UMTS there are two main options. Either, the same strategy is followed as for GSM and place the generation function in the SGSN and transport it to the UE in a UDP/TCP packet. Or, the function is placed in the RNC. There is a benefit with placing the function in the RNC. This benefit is that the RNC knows which NodeB connects to the UE. Hence, the RNC can give a more granular answer to the question where the UE is located. The SGSN only knows which RNC connects to the UE. In addition, the SGSN does not know of the radio conditions for the UE as well as the RNC or BTS.

It should be noted that there is nothing special about WLAN in the first embodiment. The target access network could be any type of network, for example, WiMAX or CDMA2000. The UE may have to provide the temporary identifier in a different way than in a NAI, but the main idea of the invention remains the same in these cases. In fact, the UE may use a different method to provide the temporary identifier to the WLAN network as well, as long as both the UE and the WLAN network agree on how to transfer it.

The disclosed solutions provide ways to give location information of the UE to the WLAN access network without introducing a new function in the core network that keeps track of the location of all subscribers. If the temporary identifier approach was not taken there would be an increased risk that, e.g., malicious insiders would use the UE location entity to invade the users' location privacy.

The invention claimed is:

1. A method for handing over a user equipment (UE) connected to a first radio access network (RAN) arranged to operate according to a first radio access technology to a second RAN arranged to operate according to a second radio access technology, the method comprising:
   the UE wirelessly connecting to a first RAN node in the first RAN, wherein the first RAN node is configured to: (i) schedule transmissions to and from UEs located in a cell served by the first RAN node, (ii) transmit radio signals to the UE, and (iii) receive radio signals transmitted by the UE;
   the UE receiving information transmitted by the first RAN node, said information being associated with an anonymized temporary identifier assigned to the UE by the first RAN node, wherein the anonymized temporary identifier represents the UE in the first RAN;
   the UE storing the received information associated with the anonymized temporary identifier;
   the UE presenting the anonymized temporary identifier to a radio access point (RAP) of the second RAN, when seeking to connect to the second RAN; and
   the UE retrieving information associated with the first RAN node and including said information in the presenting of the anonymized temporary identifier to the RAP of the second RAN when seeking to connect to the second RAN, wherein
   the information associated with the first RAN node comprises a first radio access network context, which corresponds to an identifier of the first RAN node, and/or a location of the first RAN node.

2. The method according to claim 1, wherein the received information is the anonymized temporary identifier assigned to the UE by the first RAN node.

3. The method according to claim 1, wherein the received information is data coordinated with the first RAN node during the assigning of the anonymized UE temporary identifier, whereupon the UE generates a replica of the anonymized temporary identifier based on the received information.

4. The method according claim 1, wherein the step of presenting the anonymized temporary identifier to the RAP comprises notifying the RAP of the anonymized temporary identifier during an authentication of the UE in the second RAN.

5. The method according to claim 4, wherein the anonymized temporary identifier of the UE is comprised in a network access identifier used in the authentication of the UE in the second RAN.

6. A computer program product comprising a non-transitory computer readable medium storing computer program code which, when executed in a user equipment, causes the user equipment to execute the method according to claim 1.

7. The method of claim 1, wherein the anonymized temporary identifier comprises a pseudo-random generated number.

8. The method of claim 1, wherein the anonymized temporary identifier comprises: (i) a C-RNTI of the UE and (ii) a timestamp.

9. The method of claim 1, wherein the anonymized temporary identifier is a hash of: (i) a C-RNTI of the UE and (ii) zero or more of a physical cell identity, a eNodeB (eNB) identity, and a time stamp.

10. The method of claim 9, wherein the anonymized temporary identifier is the hash of: (i) the C-RNTI of the UE and (ii) at least one or more of the physical cell identity, the eNodeB (eNB) identity, and the time stamp.

11. A user equipment (UE) connectable to a first radio access network (RAN) arranged to operate according to a first radio access technology, and to a second RAN arranged to operate according to a second radio access technology, wherein the UE is adapted to enable a handover from the first RAN to the second RAN, the UE comprising:
   a data storage unit for storing data;
   a transceiver; and
   a data processing system, comprising one or more processors, coupled to the transceiver and data storage unit, wherein the data processing system is configured to:
      employ the transceiver to wirelessly connect to a first RAN node in the first RAN, wherein the first RAN node is configured to: (i) schedule transmissions to and from UEs located in a cell served by the first RAN node, (ii) transmit radio signals to the UE, and (iii) receive radio signals transmitted by the UE,
      employ the transceiver to receive information transmitted by the first RAN node, said information being associated with an anonymized temporary identifier assigned to the UE by the first RAN node, wherein the anonymized temporary identifier represents the UE in the first RAN,
      store the received information associated with the anonymized temporary identifier in the data storage unit,
      employ the transceiver to transmit a notification comprising the anonymized temporary identifier to a radio access point (RAP) of the second RAN when seeking to connect to the second RAN, and
      retrieve information associated with the first RAN node and including said information in the notification, wherein
      the information associated with the first RAN node comprises a first radio access network context, which corresponds to an identifier of the first RAN node, and/or a location of the first RAN node.

12. The UE according to claim 11, wherein the data processing system is further configured to generate a replica of the anonymized temporary identifier based on the received information associated with the temporary identifier.

13. The UE according to claim 11, wherein the received information associated with the anonymized temporary identifier is the anonymized temporary identifier assigned to the UE.

14. A method for a first radio access network (RAN) node of a first RAN arranged to operate according to a first radio access technology, of enabling handover of connected user equipment (UE) from the first RAN to a second RAN arranged to operate according to a second radio access technology, the method comprising:
   the first RAN node assigning an anonymized temporary identifier to the UE as a result of the UE wirelessly connecting to the first RAN, wherein
      the anonymized temporary identifier represents the UE in the first RAN, and
      the first RAN node is configured to: (i) schedule transmissions to and from UEs located in a cell served by the first RAN node, (ii) transmit radio signals to the UE, and (iii) receive radio signals transmitted by the UE;
   the first RAN node transmitting information associated with the anonymized temporary identifier to the connected UE; and the first RAN node transmitting information associated with the anonymized temporary identifier to a user equipment location entity, wherein the user equipment location entity is communicatively connected to the first RAN and the second RAN, wherein the transmitted information further comprises a first RAN context of the connected UE.

15. The method according to claim 14, wherein the transmitted information corresponds to the anonymized temporary identifier assigned to the UE.

16. The method according to claim 14, wherein the transmitted information comprises data enabling the UE to generate a replica of the anonymized temporary identifier.

17. A first radio access network (RAN) node of a first RAN arranged to operate according to a first radio access technology, wherein the first RAN node is adapted to enable handover of connected user equipment (UE) from the first RAN to a second RAN arranged to operate according to a second radio access technology, the first RAN node comprising:

memory;

a transceiver; and one or more processors coupled to the transceiver and the memory, the one or more processors configured to:
assign an anonymized temporary identifier to the UE as a result of the UE wirelessly connecting to the first RAN, wherein
the anonymized temporary identifier represents the UE in the first RAN, and
the first RAN node is configured to: (i) schedule transmissions to and from UEs located in a cell served by the first RAN node, (ii) transmit radio signals to the UE, and (iii) receive radio signals transmitted by the UE;
employ the transceiver to transmit information associated with the anonymized temporary identifier to the connected UE; and
transmit information associated with the anonymized temporary identifier to a user equipment location entity, wherein the user equipment location entity is communicatively connected to the first RAN and the second RAN, wherein the transmitted information further comprises a first RAN context of the connected UE.

18. The first RAN node according to claim 17, wherein the transmitted information further comprises a first RAN context of the connected UE.

19. The first RAN node according to claim 17, wherein the first RAN is a long term evolution, LTE, radio access network and the first RAN node is an eNodeB of the LTE radio access network.

20. A computer program product comprising a non-transitory computer readable storage medium storing computer program code which, when executed in a RAN node, causes the RAN node to execute the method according to claim 17.

21. A method for a radio access point (RAP) of a first radio access network (RAN) arranged to operate according to a first radio access technology, of enabling handover of a user equipment (UE) from a second RAN arranged to operate according to a second radio access technology to the first RAN, the method comprising:

the RAP receiving an anonymized temporary identifier transmitted by the UE seeking to connect to the first RAN, wherein the anonymized temporary identifier has been assigned to the UE by a second RAN node of the second RAN, and the anonymized temporary identifier represents the UE in the second RAN;

the RAP transmitting to a network node a request message comprising the anonymized temporary identifier and requesting network context information that is associated with the anonymized temporary identifier; and the RAP receiving the network context information transmitted by the network node, wherein the network node is a user equipment location entity.

22. The method according to claim 21, further comprising:

the RAP setting up a connection to the second RAN node according to the network context information.

23. A computer program product comprising a non-transitory computer readable storage medium storing computer program code which, when executed in a RAP, causes the RAP to execute the method according to claim 21.

24. A radio access point (RAP) of a first radio access network (RAN) arranged to operate according to a first radio access technology, and adapted to enable handover of a user equipment (UE) from a second RAN arranged to operate according to a second radio access technology to the first RAN, the RAP comprising:

memory;

a transceiver;

one or more processors coupled to the transceiver and the memory, the one or more processors configured to:
employ the transceiver to receive an anonymized temporary identifier transmitted by the UE seeking to connect to the first RAN, wherein the anonymized temporary identifier has been assigned to the UE by a second RAN node of the second RAN, and the anonymized temporary identifier represents the UE in the second RAN;
employ the transceiver to transmit to a network node a request message comprising the anonymized temporary identifier and request network context information that is associated with the anonymized temporary identifier; and
employ the transceiver to receive the network context information transmitted by the network node, wherein the network node is a user equipment location entity.

25. The RAP according to claim 24, wherein the first RAN is a wireless local area network, WLAN.

26. A method for a user equipment location entity in a mobile communication network of enabling handover of a user equipment (UE) from a first radio access network (RAN) arranged to operate according to a first radio access technology to a second RAN arranged to operate according to a second radio access technology, the method comprising:

the user equipment location entity receiving information transmitted by a first RAN node of the first RAN, said information associated with an anonymized temporary identifier assigned to the UE by the first RAN node, wherein the first RAN node is configured to: (i) schedule transmissions to and from UEs located in a cell served by the first RAN node, (ii) transmit radio signals to the UE, and (iii) receive radio signals transmitted by the UE;

the user equipment location entity generating a first radio access network context for the anonymized temporary identifier by associating the information associated with the anonymized temporary identifier with a radio access node identifier, wherein the anonymized temporary identifier represents the UE in the first RAN;

the user equipment location entity storing the first radio access network context for the anonymized temporary identifier;

the user equipment location entity receiving a request for the first radio access network context transmitted by a radio access point (RAP) of the second RAN, said request comprising the anonymized temporary identifier; and as a result of receiving the request for the first radio access network context transmitted by the RAP of the second RAN, the user equipment location entity sending the first radio access network context to the RAP.

27. The method according to claim 26, wherein the first radio access network context is an IP address of the first RAN node.

28. A computer program product comprising a non-transitory computer readable storage medium storing computer program code which, when executed in a user equipment location entity, causes the user equipment location entity to execute the method according to claim 26.

29. A user equipment location entity in a mobile communication network adapted to enable handover of a user equipment (UE) connected to a first radio access network (RAN) arranged to operate according to a first radio access technology to a second RAN arranged to operate according to a second radio access technology, the user equipment location entity comprising:

memory; and one or more processors coupled to the memory, the one or more processors configured to:

receive information transmitted by a first RAN node of the first RAN, said information associated with an anonymized temporary identifier assigned to the UE by the first RAN node, wherein the first RAN node is configured to: (i) schedule transmissions to and from UEs located in a cell served by the first RAN node, (ii) transmit radio signals to the UE, and (iii) receive radio signals transmitted by the UE , generate a first radio access network context for the anonymized temporary identifier by associating the information associated with the anonymized temporary identifier with a radio access node identifier, wherein the anonymized temporary identifier represents the UE in the first RAN, store the first radio access network context for the anonymized temporary identifier in the memory, receive a request for the radio access network context transmitted by a radio access point (RAP) of the second RAN, said request comprising the anonymized temporary identifier, and as a result of receiving the request for the first radio access network context transmitted by the RAP of the second RAN, send the first radio access network context to the RAP.

* * * * *